United States Patent Office.

RUDOLF SILBERBERG, OF BROOKLYN, ASSIGNOR TO HENRY WILLIAM HOOP, SR., OF NEW YORK, N. Y.

MANUFACTURE OF CREAM OF TARTAR.

SPECIFICATION forming part of Letters Patent No. 313,629, dated March 10, 1885.

Application filed November 19, 1884. (No specimens.)

*To all whom it may concern:*

Be it known that I, RUDOLF SILBERBERG, of the city of Brooklyn, in the county of Kings and State of New York, have invented certain new and useful Improvements in the Manufacture of Cream of Tartar, of which the following is a specification.

Cream of tartar and chlorate of sodium were heretofore manufactured by mixing tartaric acid with carbonate of soda and chlorate of potassium. The tartaric acid required for this process was obtained by any known methods. The mother-liquors of the tartaric-acid manufacture contain a considerable percentage of tartaric acid, which was heretofore obtained by concentration and crystallization. The crystals are colored by the impurities in the mother-liquors and are of little value.

This invention relates to an improved process of making cream of tartar by utilizing the mother-liquors obtained in the manufacture of tartaric acid and regaining nearly all of the tartaric acid contained therein, and obtaining also chlorate of sodium as a by-product; and the invention consists of a process of making cream of tartar, first by making tartaric acid by any approved method, and then treating the mother-liquors obtained in the manufacture of tartaric acid with soda and potassium chlorate so as to obtain potassium bitartrate and chlorate of sodium.

In carrying out my invention, fifty pounds of argols are boiled for two hours with six pounds of lime and sixteen pounds of water, and then neutralized with three pounds and six ounces of hydrochloric acid. The solution is allowed to settle for twelve hours, and is then filtered to obtain calcium tartrate, which is treated with eleven pounds of sulphuric acid and eleven pounds of water, and kept in motion for half an hour at ordinary temperature. To the solution are added eleven pounds of water, and the whole passed through the filter-press. The solution contains about thirty pounds of tartaric acid, which is crystallized by evaporation of the solution.

In place of this method of making tartaric acid, any other approved method for making the same may be used. Two thousand five hundred pounds of the mother-liquors thus obtained are then mixed with a solution of one hundred and thirty pounds of carbonate of soda in fifty pounds of water and with a boiling solution of three hundred pounds of potassium chlorate in one thousand five hundred pounds of water, which latter is added under continual stirring. As a result of the reaction, tartrate of potassium is precipitated in small crystals. The solution is then allowed to cool off slowly, whereby nearly all potassium bitartrate, or "cremor tartari," contained therein are precipitated. The chlorate of sodium is obtained from the remaining solution by evaporation to 52° Baumé and crystallization. The reaction takes place according to the following formula: $2C_4H_6O_6 + Na_2CO_3 + 2KClO_3 = H_2O + CO_2 + 2C_4H_5KO_6 + 2NaClO_3$.

In place of the soda, an equivalent quantity of crystallized or caustic soda may be used.

The advantages of my improved process are that cream of tartar is obtained directly from the mother-liquors of the tartaric acid manufacture in white crystals and free of lime, whereby the evaporation and crystallization of the mother-liquors are obviated. The yield of cream of tartar is larger, and the plant required less expensive than that required for making cream of tartar by the methods heretofore in use. Besides, I obtain chlorate of sodium as a valuable by-product, which is extensively used in the arts.

Having thus described my invention, I claim as new and desire to secure by Letters Patent—

The process herein described of making cream of tartar, which consists in separating tartaric acid from argols by any approved method, and then treating the mother-liquors obtained thereby with soda and potassium chlorate, substantially as set forth.

In testimony that I claim the foregoing as my invention I have signed my name in presence of two subscribing witnesses.

RUDOLF SILBERBERG.

Witnesses:
 CARL KARP,
 SIDNEY MANN.